(12) United States Patent
Gindi

(10) Patent No.: US 8,276,599 B2
(45) Date of Patent: Oct. 2, 2012

(54) PERSONAL ELECTRONICS DEVICE WITH COSMETICS COMPARTMENT

(76) Inventor: Isaac Gindi, Brooklyn, NY (US)

( * ) Notice: Subject to any disclaimer, the term of this patent is extended or adjusted under 35 U.S.C. 154(b) by 1063 days.

(21) Appl. No.: 12/005,419

(22) Filed: Dec. 26, 2007

(65) Prior Publication Data
US 2009/0166247 A1 Jul. 2, 2009

Related U.S. Application Data

(60) Provisional application No. 60/876,653, filed on Dec. 22, 2006.

(51) Int. Cl.
*A45D 33/24* (2006.01)
*A45D 27/22* (2006.01)
*B65D 71/00* (2006.01)

(52) U.S. Cl. ......... 132/315; 132/294; 206/823; 206/581

(58) Field of Classification Search .................. 132/315, 132/294–297, 300, 301, 314, 316; 455/550.1, 455/556.1, 550; 206/823, 581
See application file for complete search history.

(56) References Cited

U.S. PATENT DOCUMENTS

| | | | | |
|---|---|---|---|---|
| 2,031,933 A * | 2/1936 | Clegg | ............................. | 132/287 |
| 4,589,430 A * | 5/1986 | Sussman | ........................ | 132/218 |
| 6,311,077 B1 * | 10/2001 | Bien | ............................. | 455/566 |
| 6,363,947 B1 * | 4/2002 | Wu | ............................. | 132/297 |
| 6,540,083 B2 * | 4/2003 | Shih | ............................. | 206/581 |
| 7,054,668 B2 * | 5/2006 | Endo et al. | .................... | 455/566 |
| 7,146,184 B1 * | 12/2006 | Tsitsiashvili | .............. | 455/550.1 |
| 7,340,238 B2 * | 3/2008 | Napier-Clark | ................ | 455/347 |
| 2002/0137537 A1 * | 9/2002 | Watanabe | ..................... | 455/550 |

FOREIGN PATENT DOCUMENTS
WO WO 2004086732 A1 * 10/2004
* cited by examiner

*Primary Examiner* — Robyn Doan
(74) *Attorney, Agent, or Firm* — Goldberg Cohen LLP

(57) ABSTRACT

A personal electronics device of the type such as, but not limited to, cell phones, personal digital assistants, digital camera, and digital electronic games, includes a case having a first compartment and a second compartment. A series of integrated electronic components perform a desired personal electronic function wherein at least a portion of the components are housed in the first compartment. The second compartment defines a selectively accessible storage volume. A cosmetic tray is housed in the accessible storage volume and has at least one form of cosmetic selected from the group of nail polish, mascara, eyeliner, lipstick, lip liner, and lip gloss.

4 Claims, 6 Drawing Sheets

PERSONAL ELECTRONICS DEVICE WITH COSMETICS COMPARTMENT

CROSS REFERENCE TO RELATED APPLICATIONS

This application claims the benefit of U.S. Provisional Patent Application Ser. No. 60/876,653 filed Dec. 22, 2006, which is fully incorporated herein by reference.

BACKGROUND OF THE INVENTION

1. Field of the Invention

The present invention relates to personal electronics devices in general and more particularly to a personal electronics device having a case that includes a compartment for cosmetics.

2. Discussion of the Related Art

From centuries past, women have been wearing cosmetics to enhance their physical appearance. Cosmetics containers are well known in the art. A large variety of such containers are currently commercialized and sold. They include small cases, such as tubes or circular cases for containing lipstick, mascara, eyeliner, lip liner, nail polish, and other health and beauty aids. Such containers with the cosmetics included therein, are widely used by people from adolescence to old age.

Women have typically carried their cosmetics with them in abbreviated form by using containers also known as "compacts" that they keep in a handbag in which they also keep other personal items such as a wallet, keys, tissues, pens, notepads, etc. for convenience. In order to conserve space in a woman's handbag, compacts are typically made to be relatively thin with a mirror integrated within the compact. The compact will typically have one or more small compartments for each composition of makeup contained therein. In this manner a woman can touch up her makeup throughout the day without the need for an entire collection of separate bottles and containers.

In recent years the wearing of cosmetics has also become ever more popular with teenage girls. However, today's teenage girls generally shun the use of handbags and are most often seen wearing casual clothes and carrying only those items they consider to be essential to their daily life. Typically, these essentials are limited to a form of identification, money, and a cell phone or other type of personal electronics device such as a personal digital assistant or a digital electronic game. Since they shun the carrying of handbags, these adolescent girls are limited in the number and bulk of items that they can carry on their person. Additionally, adolescent girls are always looking for new and unique items to enhance their appearance and stature among their peers.

Thus what is desired is a personal electronics device such as a cell phone, personal digital assistant, or digital electronic game that incorporates within its case a compartment for containing replaceable cosmetic trays.

SUMMARY OF THE INVENTION

The present invention is directed to personal electronics devices that include a compartment for cosmetics that satisfies the need for a convenient way to carry cosmetics with the personal electronics device. The personal electronics device is of the type such as, but not limited to, cell phones, personal digital assistants, digital camera, and digital electronic games and includes a case having a first compartment and a second compartment. A series of integrated electronic components perform a desired personal electronics function wherein at least a portion of the components are housed in the first compartment. The second compartment defines a selectively accessible storage volume. A cosmetic tray is housed in the accessible storage volume and has at least one form of cosmetic selected from the group of nail polish, mascara, eyeliner, lipstick, lip liner, and lip gloss.

Another aspect of the present invention is a personal electronics device of the type such as, but not limited to, cell phones, personal digital assistants, digital camera, and digital electronic games, wherein the personal electronics device includes a case having a first compartment and a second compartment. The first compartment houses at least a portion of a series of integrated electronic components to perform a desired personal electronic function. The second compartment defines a selectively accessible storage volume and contains therein a replaceable cosmetic tray. The cosmetic tray includes thereon at least one form of cosmetic selected from the group of nail polish, mascara, eyeliner, lipstick, lip liner, and lip gloss, and also includes a readable electronic identification module for recognition by the series of integrated electronic components.

Yet another aspect of the present invention is a replaceable cosmetics tray for use in a personal electronics device of the type having a first compartment for housing a series of integrated electronic components for performing a desired personal electronic function and a second compartment for housing the replaceable cosmetics tray. The replaceable cosmetics tray includes a substrate configured to be received in the second compartment and defines at least one recess for holding a cosmetic therein. At least one form of cosmetic is deposited in the recess, the cosmetic being selected from the group of nail polish, mascara, eyeliner, lipstick, lip liner, and lip gloss. A readable electronic identification module is associated with the tray for recognition by the series of integrated electronic components.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF THE PREFERRED EMBODIMENT

Figure 1:
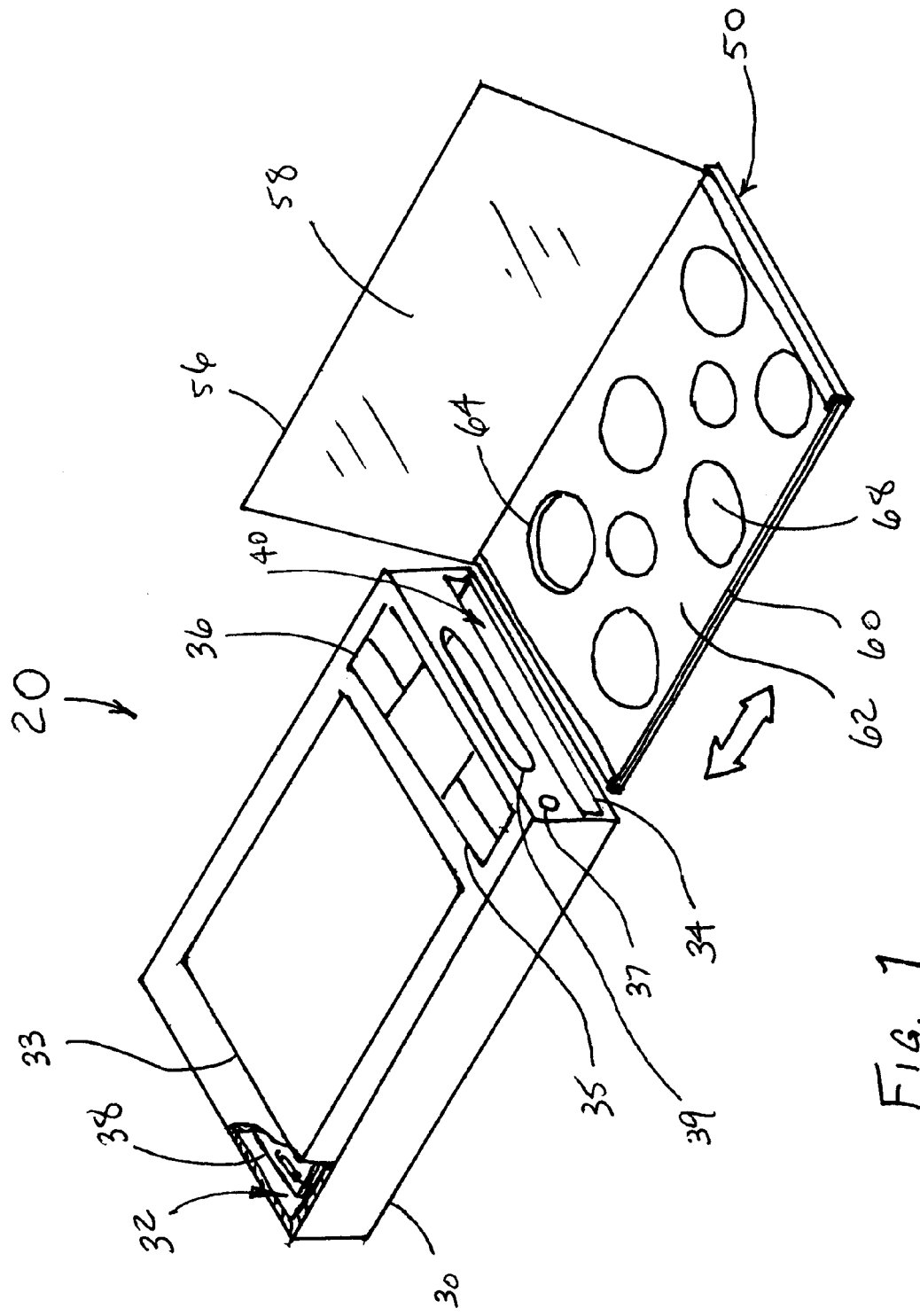
FIG. 1 is a perspective view of a personal electronics device embodying the present invention, wherein the personal electronics device includes a compartment housing a cosmetics tray.

For purposes of description herein, the terms "upper", "lower", "left", "rear", "right", "front", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a personal electronics device 20 which is one of the preferred embodiments of the present invention and illustrates its various components. Personal electronics device 20 is here illustrated as a personal digital assistant, but the practices and concepts recited in the following descriptions and claims are also applicable to other personal electronic devices such as cellular telephones, digital cameras, digital electronic games, and other similar personal electronic devices.

Personal electronic device 20 has a case 30 which retains all components in a functional arrangement and for component protection. Case 30 allows for ease of transporting and can be decorated in an endless configuration of designs, colors, and entertaining features such as blinking lights, etc. Case 30 is generally divided into a first compartment 32 and a second compartment 40. First compartment 32 is dedicated to housing a series of integrated electronic components 38 that perform a desired personal electronic function such as transmitting and receiving a cellular telephone call, taking a digital picture, or playing a digital electronic game as examples. Case 30 can also include user interactive features such as a display screen 33, user control keys 35, 36, a removable stylus 37, and can also feature a receptacle 39 for receiving small digital electronic cards (not shown) for memory storage or for providing additional functionality to personal electronic device 20.

Figure 2:
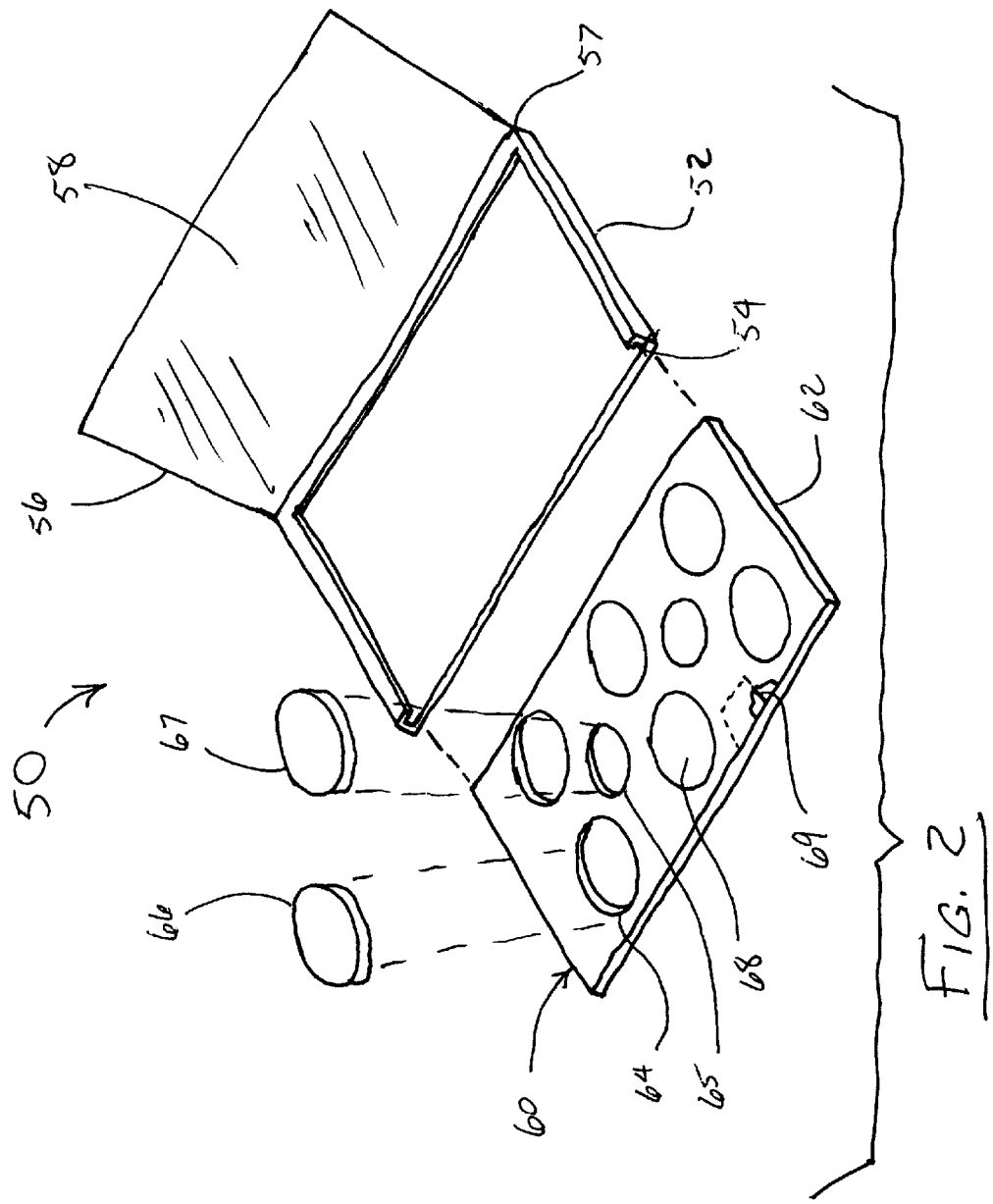
FIG. 2 is an exploded perspective view of the cosmetics tray of FIG. 1.

Second compartment 34, while an integral part of case 30 is generally isolated from first compartment 32. Second compartment 34 defines a selectively accessible storage volume 40 in which the user may store any article that is compatible with the storage volume 40. In the most preferred embodiment, a cosmetic insert 50 received in storage volume 40 is provided with the personal electronics device 20. Referring now to FIG. 2, cosmetic insert 50 typically includes a tray carrier 52 having a recess 54 for receiving therein in slidable fashion cosmetic tray 60. Tray carrier 52 can also incorporate a folding cover 56 that is rotatable about hinge 57 to cover cosmetic tray 60 for storage in second compartment 34. Folding cover 56 can also have a mirror 58 attached thereto for the convenience of the user. Cosmetic tray 60 is readily removable from carrier 52 and is thus readily replaceable with a replacement cosmetic tray 50 once the cosmetics have been depleted.

Cosmetic tray 60 in its most common configuration includes a substrate 62. Substrate 62 defines a plurality of recesses 64, 65 wherein each recess 64, 65 receives therein a unique cosmetic deposit 66, 67 respectively. Cosmetic deposits 66, 67 are typically selected from at least one of the forms of nail polish, mascara, eyeliner, lipstick, lip liner, and lip gloss, and can be of a variety of colors and shades to suit the desires of the user. The cosmetic deposits such as deposits 66, 67 when received in a recess such as recesses 64, 65 are securely held in place in a manner well known in the industry to prevent the spillage of the cosmetic from the tray 60 during use and carrying of the personal electronics device. Substrate 62 is also formed in a manner well known in the cosmetics industry and its peripheral form factor is regulated to fit carrier 52.

Substrate 62 further has associated therewith a readable electronic identification module 69. Readable electronic identification module 69 is readable by the series of integrated electronic components 38 that perform the desired electronic function of device 20. In such manner, the series of integrated electronic components 38 can determine the presence or absence of a cosmetic tray 60 having the proper configuration for accessorizing device 20. If an incorrect or undesired cosmetic tray is inserted in carrier 52, the series of integrated electronic components 38 will not recognize the incorrect cosmetic tray and through internally programmed protocols, the series of integrated electronic components 38 will be at least partially disabled and the device 20 will not function in its desired manner. Readable electronic identification module 69 can be either affixed to a surface of substrate 62 or alternatively embedded therein to prevent unauthorized tampering of readable electronic identification module 69. In its most common form, readable electronic identification module 69 is a radio frequency identification device which is well known in the industry and can be encoded with a readable signature for recognition by the series of integrated electronic components 38 of device 20.

Figure 4:
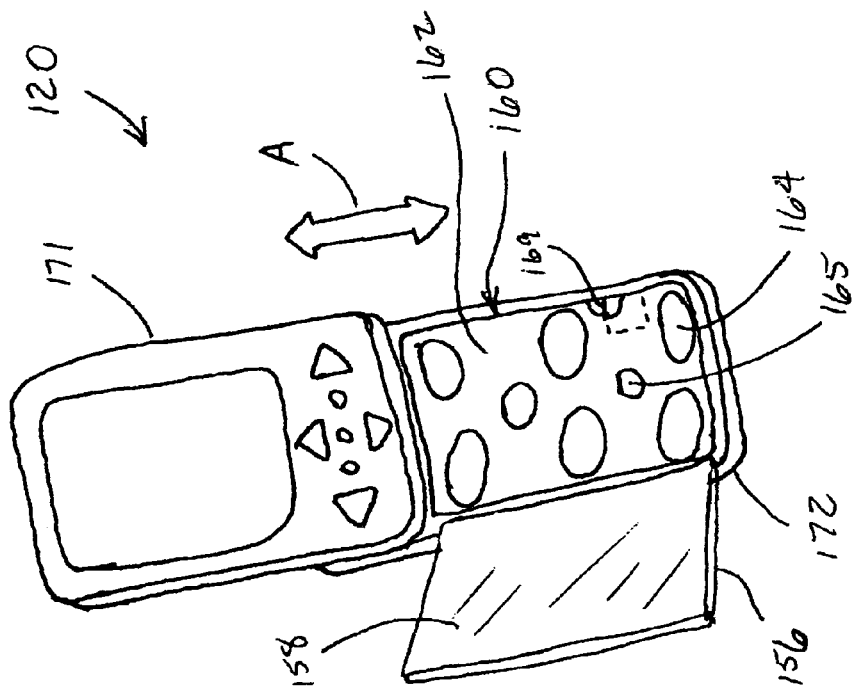
FIG. 4 is a perspective view of the personal electronics device of FIG. 3 wherein the first and second segments are linearly displace one with respect to the other to reveal the cosmetics tray.
Figure 3:
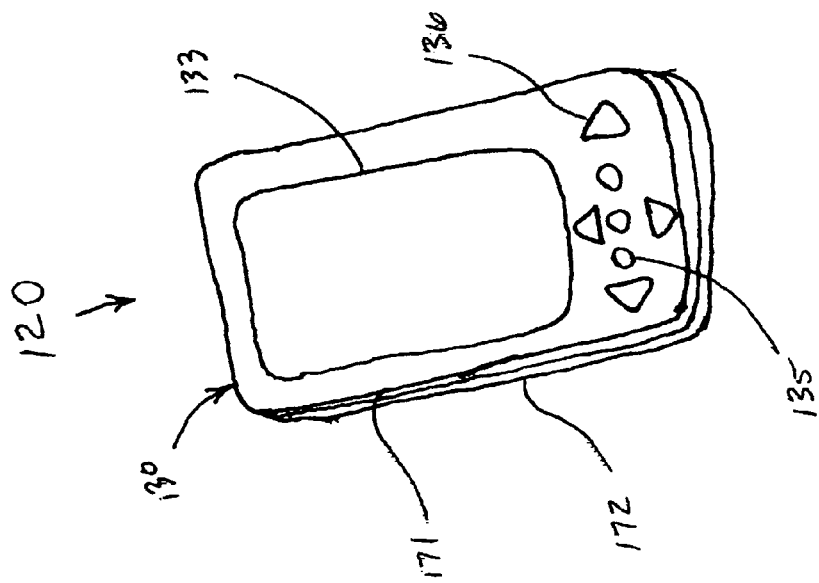
FIG. 3 is a perspective view of an alternate embodiment of a personal electronics device incorporating a cosmetics tray wherein the first and second segments linearly slide one with respect to the other.

Turning now to FIGS. 3-4, an alternate embodiment 120 of a personal electronics device is illustrated wherein the personal electronics device is of the form of a digital electronic game having a viewable screen 133 and user control buttons 135, 136. Device 120 has a case 130 divided into two segments 171, 172 wherein first segment 171 defines the first compartment 132 for housing its series of integrated electronic components 138 (not separately illustrated), viewable screen 133, and user control buttons 135, 136. Second segment 172 is slidably translatable with respect to first segment 171 as shown by arrow "A" in FIG. 4. Second segment 172 houses therein a removable cosmetics tray 160 comprising a substrate 162 having a plurality of cosmetic deposits 164, 165 retained therein and also can include a readable electronic identification module 169 associated therewith. Second segment 171 can also have a folding cover 156 hingedly attached thereto to cover cosmetics tray 160 when in a closed configuration. Folding cover 156 can also have a mirror 158 affixed thereto for the convenience of the user.

Figure 6:
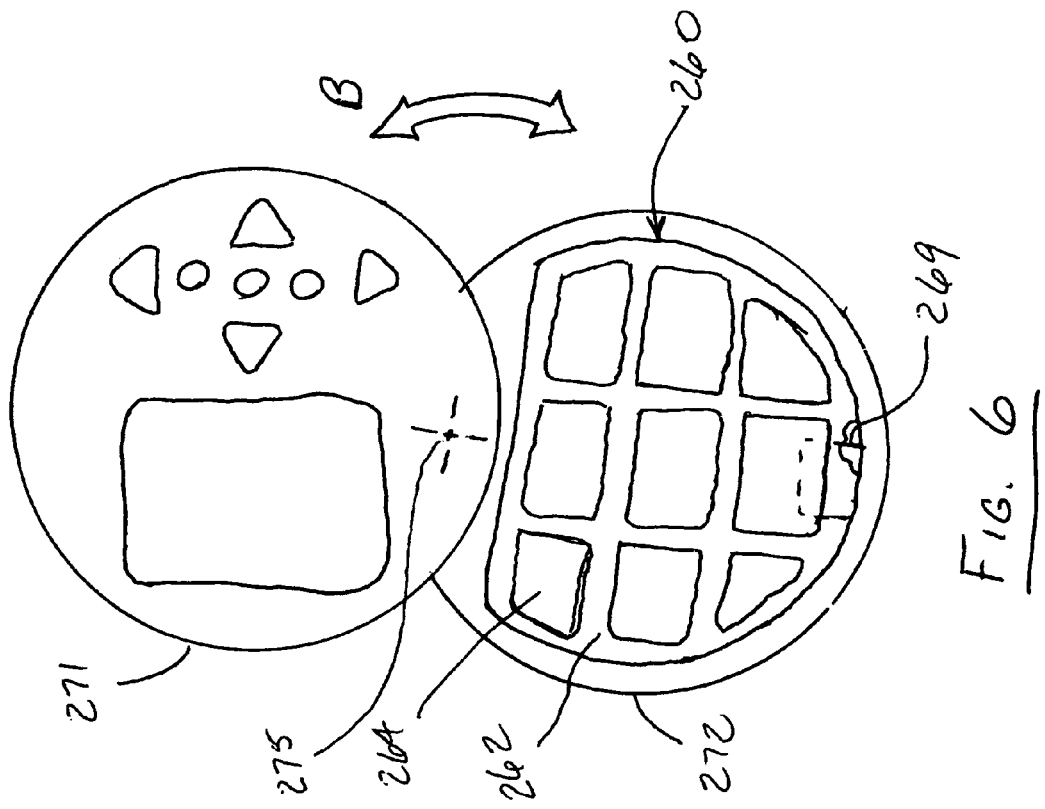
FIG. 6 is a perspective view of the personal electronics device of FIG. 5 wherein the first segment is pivoted with respect to the second segment to reveal the cosmetics tray.
Figure 5:
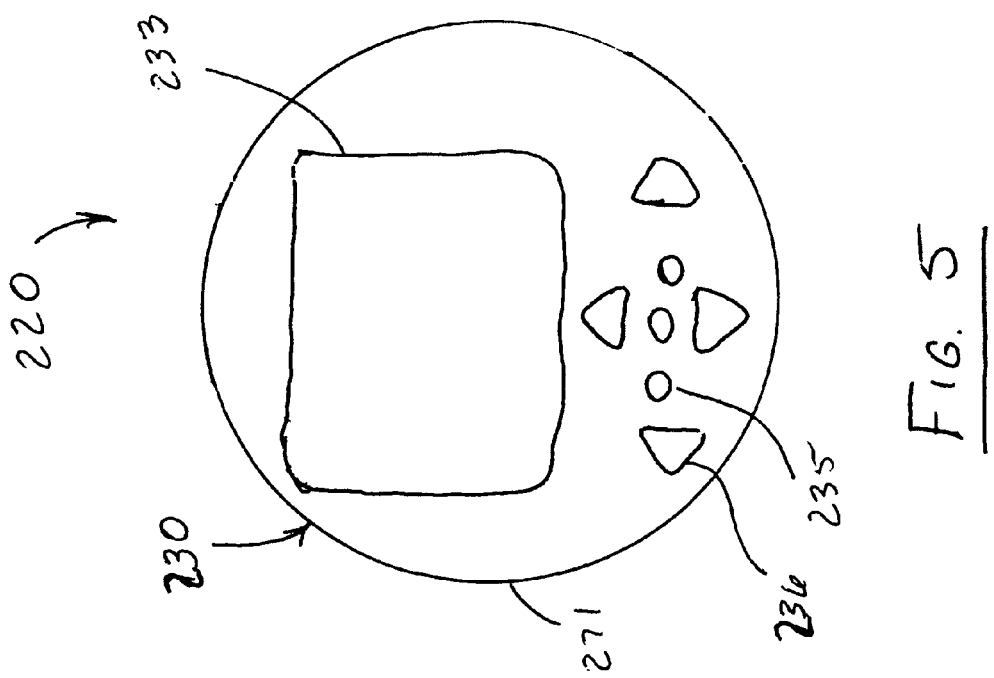
FIG. 5 is a perspective view of an alternate embodiment of a personal electronics device incorporating a cosmetics tray wherein the first and second segments are pivotal one with respect to the other.

Yet another embodiment of a personal electronics device 220 is illustrated in FIGS. 5-6 wherein device 220 includes a case 230 having a first segment 271 and a second segment 272. First segment 271 includes the series of integrated electronic components 238 (not here illustrated), a viewable screen 233, and user control buttons 235, 236 for user interface with device 220. Second segment 272 includes a replaceable cosmetics tray 260 having a plurality of cosmetic deposits 264 received in a compatibly formed substrate 262.

Substrate 262 can also include a readable electronic identification module 269 associated therewith for recognition by the series of integrated electronic components 238 in segment 271. First and second segments 271 and 272 are pivotally affixed one to the other at pivot point 275 such that access to cosmetics tray 260 is accomplished by pivoting segments 271 and 272 in opposite directions as indicated by arrow "B". Once the cosmetic tray is no longer in use, segments 271 and 272 can be pivoted in reverse manner to conceal cosmetics tray below segment 271.

Figure 7:
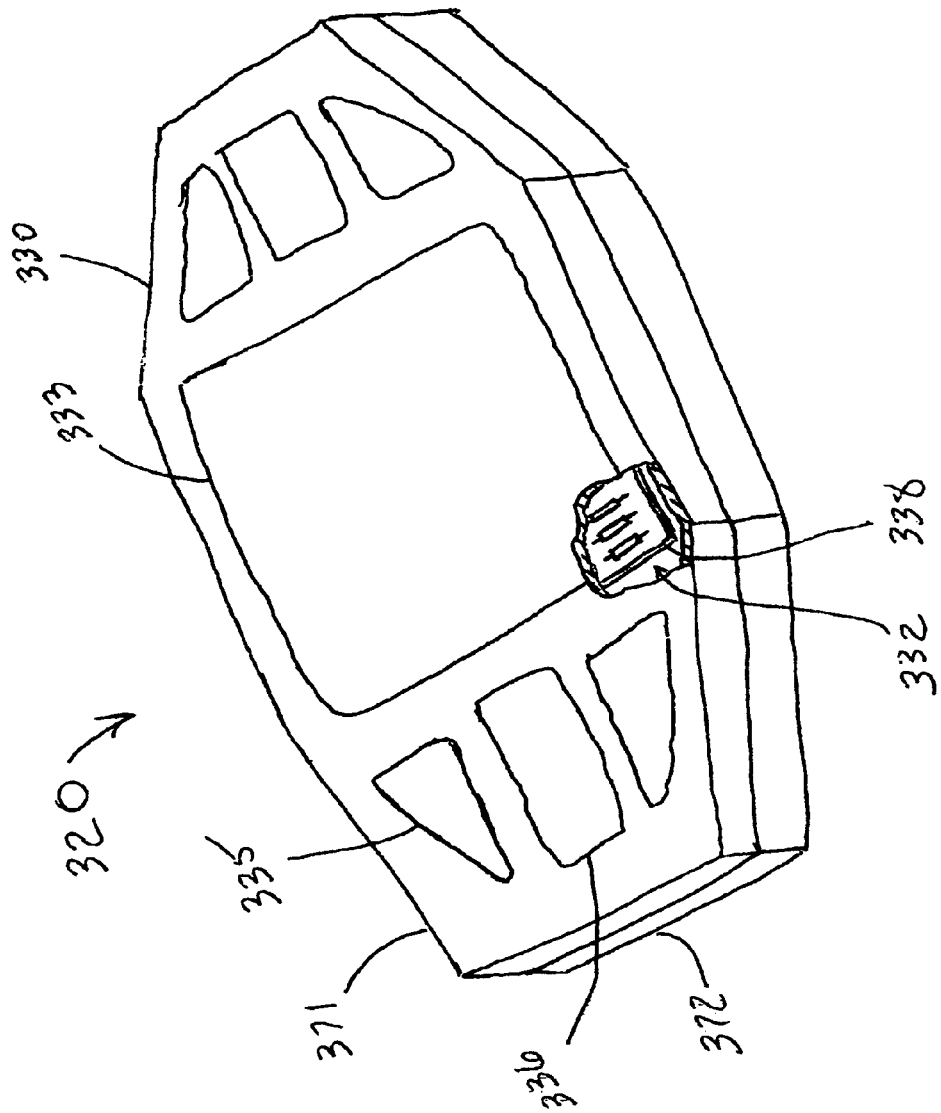
FIG. 7 is a perspective view of an alternate embodiment of a personal electronics device incorporating a cosmetics tray wherein the cosmetics tray is at least partially covered by one or more hinged lids.
Figure 8:
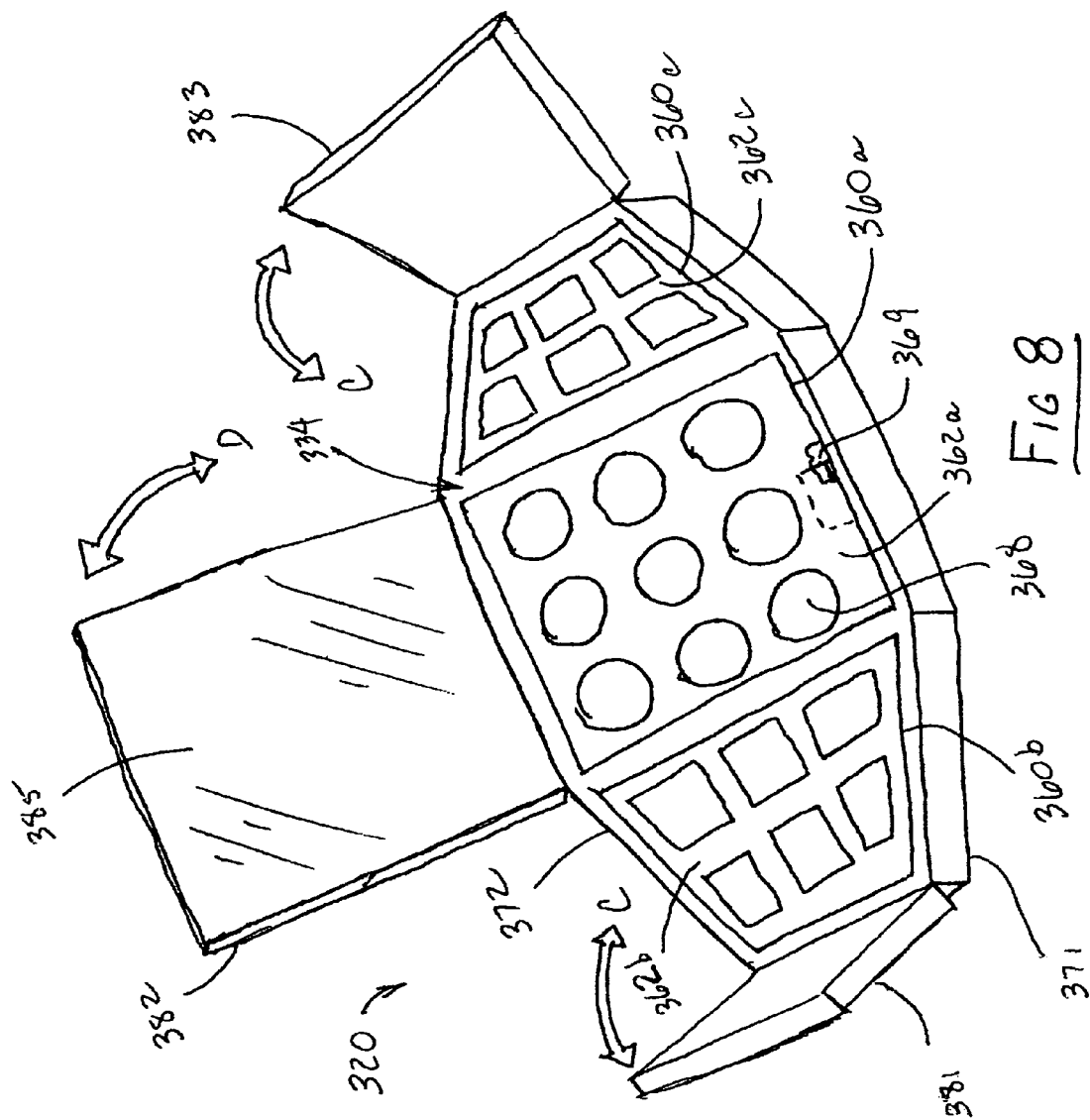
FIG. 8 is a perspective view of the personal electronics device of FIG. 7 wherein the cosmetics tray is revealed by opening the one or more lids.

Another embodiment of a personal electronics device according to the present invention is illustrated in FIGS. 7-8 showing device 320 having a case 330 comprising first segment 371 and a second segment 372. First segment 371 in a like manner to previous embodied devices 20, 120, and 220 houses a series of integrated electronic components 338 in a compartment 332 for performing a desired electronic function and further includes a viewable display 333 and user control keys 335, 336. In device 320, however, segments 371 and 372 are not movable one with respect to the other. Segment 372 is positioned oppositely from segment 371 in case 330 and has an interior compartment 334 accessible via one or more hinged covers 381, 382, 383. Outer hinged covers 381, 383 are opened by rotating according to the direction arrows "C", while middle cover 382 is opened by rotating according to direction arrow "D". Middle cover 382 can also include a mirror 385 on an inner surface for the convenience of the user. Interior compartment 334 has housed therein one or more cosmetic trays 360a, 360b, and 360c. Each cosmetic tray 360a, 360b, 360c comprises a substrate 362a, 362b, and 362c in which are contained a plurality of cosmetic deposits 368. Further, at least one substrate such as substrate 362a includes a readable electronic identification module 369 associated therewith either by being attached thereto or embedded therein for reading by the series of integrated electronic components 338 that also perform the desired function of device 320. In its most preferred embodiment, each of the substrates 362a, 362b, and 362c of device 320 includes a readable electronic identification module 369. Each cosmetic tray 360a, 360b, and 360c is independently replaceable such as to prevent the necessity of discarding all of the cosmetics when only a portion of the trays 360a, 360b, and 360c have been depleted.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A personal electronics device of the type such as, but not limited to, cell phones, personal digital assistants, digital cameras, and digital electronic games, wherein said personal electronics device comprises:
   a case having a first compartment and a second compartment, said second compartment defining a selectively accessible storage volume;
   a series of integrated electronic components to perform a desired personal electronic function wherein at least a portion of said components are housed in said first compartment; and
   a cosmetic insert housed in said accessible storage volume and removable from said accessible storage volume, said cosmetic insert comprising a tray carrier and a cosmetic tray, wherein said cosmetic tray is replaceably inserted in said tray carrier, said cosmetic tray having at least one form of cosmetic selected from the group of nail polish, mascara, eyeliner, lipstick, lip liner and lip gloss;
   wherein said cosmetic tray includes an electronics identification module readable by said series of integrated electronic components and further wherein said desired personal electronic function is at least partially disabled when said electronic identification module is absent from said cosmetic tray.

2. The personal electronics device according to claim 1 wherein said case includes at least one hinged cover, said at least one hinged cover movable between a closed position and an open position, and further wherein said at least one hinged cover in said closed position partially defines said accessible storage volume;
   wherein said cosmetic tray is at least partially revealed when said at least one hinged cover is in said open position; and
   wherein said personal electronics device further includes a moveable lid covering said cosmetic tray, said moveable lid being a mirror.

3. A personal electronics device of the type such as, but not limited to, cell phones, personal digital assistants, digital cameras, and digital electronic games, wherein said personal electronics device comprises:
   a case having a first compartment and a second compartment, said second compartment defining a selectively accessible storage volume;
   a series of integrated electronic components to perform a desired personal electronic function wherein at least a portion of said components are housed in said first compartment; and
   a cosmetic tray housed in said accessible storage volume, said cosmetic tray having at least one form of cosmetic selected from the group of nail polish, mascara, eyeliner, lipstick, lip liner, and lip gloss;
   wherein said case comprises a first case segment defining said first compartment and a second case segment defining said second compartment and further wherein said first case segment slides in a rotating fashion with respect to said second case segment;
   wherein said cosmetic tray is revealed when said first case segment is rotatably slid away from said second case segment; and
   wherein said cosmetic tray is replaceable and includes an electronic identification module readable by said series of integrated electronic components and further wherein said desired personal electronic function is at least partially disabled when said electronic identification module is absent from said cosmetic tray.

4. A personal electronics device of the type such as, but not limited to, cell phones, personal digital assistants, digital camera, and digital electronic games, wherein said personal electronics device comprises:
   a case having a first compartment and a second compartment, said second compartment defining a selectively accessible storage volume;
   a series of integrated electronic components to perform a desired personal electronic function wherein at least a portion of said components are housed in said first compartment; a replaceable cosmetic tray housed in said accessible storage volume, said cosmetic tray having at least one form of cosmetic selected from the group of nail polish, mascara, eyeliner, lipstick, lip liner, and lip gloss; and a readable electronic identification module associated with said removable cosmetics tray for recognition by the series of integrated electronic components;

wherein said removable cosmetics tray includes a substrate configured to be received in the second compartment, said substrate defining at least one recess for holding a cosmetic therein; and wherein said readable identification module is affixed to a surface of said substrate.

* * * * *